United States Patent Office 3,514,456
Patented May 26, 1970

3,514,456
1-HYDROXYALKYL-4-SUBSTITUTED-PIPERIDINES
Michio Nakanishi, Oita, and Tsuneto Kuriyama and Katsuo Arimura, Fukuoka, Japan, assignors to Yoshitomi Pharmaceutical Industries, Ltd., Higashiku, Osaka, Japan
No Drawing. Filed Sept. 28, 1967, Ser. No. 671,235
Claims priority, application Japan, Aug. 7, 1967, 42/50,670
Int. Cl. C07d 29/28, 51/70, 87/40
U.S. Cl. 260—247.5                                 13 Claims

ABSTRACT OF THE DISCLOSURE 1-hydroxyalkyl-4-substituted-piperidines of the formula:

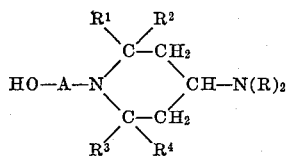

wherein A is ethylene, oxydiethylene, propylene, trimethylene, (hydroxymethyl)ethylene, (chloromethyl)ethylene or phenylethylene, —N(R)$_2$ is pyrrolidino, piperidino, morpholino or 4-methyl-1-piperazinyl, and each of R$^1$, R$^2$ and R$^3$ and R$^4$ is H or methyl, are useful as tranquilizers, sedatives or hypnotics.

---

This invention relates to novel and pharmacologically valuable 1-hydroxyalkyl-4-substituted-piperidines.

The novel piperidine compounds are of the formula:

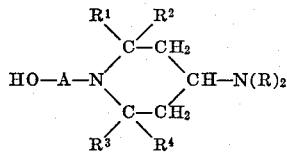

wherein A is ethylene, oxydiethylene (—CH$_2$CH$_2$OCH$_2$CH$_2$—)

propylene (—CH(CH$_3$)CH$_2$—), trimethylene (—CH$_2$CH$_2$CH$_2$—)

(hydroxymethyl)ethylene (—CH(CH$_2$OH)CH$_2$—), (chloromethyl)ethylene (—CH(CH$_2$Cl)CH$_2$—) or phenylethylene (—CH(C$_6$H$_5$)CH$_2$—); —N(R)$_2$ is pyrrolidino, piperidino, morpholino or 4-methyl-1-piperazinyl; and each of R$^1$, R$^2$, R$^3$ and R$^4$ is H or methyl.

They are prepared by reacting a 4-substituted piperidine of the formula:

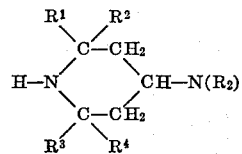

either with an epoxy compound of the formula:

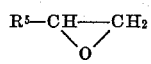

wherein R$^5$ is H, methyl, hydroxymethyl, chloromethyl or phenyl, or with a halohydrin of the formula:

wherein Hal is halogen (e.g. Cl, Br) and A' is ethylene, propylene, trimethylene, (hydroxymethyl)ethylene, (chloromethyl) ethylene or phenylethylene.

Thus, for example, 4-pyrrolidinopiperidine, 4-piperidinopiperidine, 4-morpholinopiperidine, 4-(4-methyl-1-piperazinyl)piperidine or 4-pyrrolidino-2,2,6,6-tetramethylpiperidine is allowed to react with an about equimolar amount of ethylene oxide, propylene oxide, glycidol (2,3-epoxypropanol), epichlorohydrin or styrene oxide, in a solvent such as methanol, ethanol, benzene, toluene, dimethylformamide or diethyl ether at room temperature or at an elevated temperature, optimally in the presence of an about equimolar amount of water. To prepare the product (I), where A is oxydiethylene, two moles of ethylene oxide are reacted with one mole of the starting piperidine in a similar manner.

The reaction of the starting piperidine and the halohydrin such as ethylene chloro-hydrin or ethylene bromo-hydrin, propylene chloro-hydrin or propylene bromo-hydrin, trimethylene chloro-hydrin or trimethylene bromo-hydrin or 1-bromo-3-chloro-2-propanol is carried out in a solvent such as methanol, ethanol, chloroform, carbon tetrachloride, benzene, toluene or xylene, in the presence of a hydrogen halide acceptor such as pyridine, triethylamine or potassium carbonate with heating at about 60° to 70° C.

The produced 1-hydroxyalkyl-4-substituted-piperidines can be converted by per se conventional methods into pharmaceutically acceptable acid addition salts (e.g. hydrochloride, nitrate, sulfate, acetate, maleate, fumarate).

The 1-hydroxyalkyl-4-substituted-piperidine compounds (I) of the invention have sedative and hypnotic actions and potentiate the hypnosis caused by methylhexabital.

For example, when mice are intraperitoneally administered with compound (I), e.g. 1-(2-hydroxpropyl)-4-pyrrolidinopiperidine or 1-(2-hydroxyethyl-4-pyrrolidinopiperidine, in an amount of 1.0 milligram per 10 grams of body weight twenty minutes after the intraperitoneal injection of methyl-hexabital sodium in an amount of 0.7 milligram per 10 grams of body weight, the hypnotic action is potentiated four times as high as the level caused by the administration of sole methyl-hexabital sodium, i.e. 5-cyclohexenyl-3,5-dimethylbarbituric acid (sodium salt).

When mice are intraperitoneally administered with pentylenetatrazol in an amount of 0.9 milligram per 10 grams of body weight (LD$_{100}$ in mice), tonic extension is observed in the mice four to five minutes after the administration, and death of all the mice results. Intraperitoneal administration of 1-(2-hydroxyethyl)-4-pyrrolidinopiperidine or 1-(2-hydroxypropyl)-4-pyrrolidinopiperidine in an amount of 0.5 milligram per 10 grams prolongs the latent period of tonic extension caused by pentylenetatrazol, and protects the mice from death.

When rats are intraperitoneally administered with compound (I), e.g. 1-(2-hydroxyethyl)-4-pyrrolidinopiperidine in an amount of 50 milligrams per kilogram of body weight, suppression of condition avoidance is observed for about one hour. The suppression lasts for about 6 hours when the compound is administered in an amount of 100 milligrams per kilogram.

Rabbits are intravenously administered 2 milligrams of 1-(2-hydroxyethyl)-4-pyrrolidinopiperidine or 1-(2-hydroxypropyl)-4-pyrrolidinopiperidine, and thereupon exhibit a slow wave pattern in electroencephalographic recording.

Acute toxicity of 1-(2-hydroxyethyl)-4-pyrrolidinopiperidine or of 1-(2-hydroxypropyl)-4-pyrrolidinopiperidine is, when administered orally, 1000 milligrams per kilogram in mice in terms of LD$_{50}$.

As is clear from the above results, piperidine compounds of the invention are useful in mammals as sedatives, hypnotics or tranquilizing agents.

The effective dose of present compound (I) is, when administered orally, about 50 to 1000 milligrams per day for adult mammals.

In the following examples, which are solely illustrative in character, parts by weight bear the same relationship to parts by volume as do grams to milliliters.

EXAMPLE 1

4.5 parts by weight of 4-pyrrolidinopiperidine is dissolved in 60 parts by volume of ethanol, and 0.6 part by weight of water and 1.32 parts by weight of ethylene oxide are added. The mixture is allowed to stand at room temperature (about 15° to about 30° C.) for 72 hours. Then the solvent is distilled off under reduced pressure. The residue is dissolved in 80 parts by volume of ethyl acetate and treated with 14 parts by weight of maleic acid to give 8.7 parts by weight of 1 - (2-hydroxyethyl)-4-pyrrolidinopiperidine di(hydrogen maleate), white crystals with a melting point of 184° to 187° C.

*Analysis.*—Calculated for $C_{19}H_{30}O_9N_2$ (percent): C, 53.01; H, 7.03; N, 6.51. Found (percent): C, 53.29; H, 6.93; N, 6.60.

EXAMPLE 2

5.03 parts by weight of 4-piperidinopiperidine, 70 parts by volume of ethanol, 0.6 part by weight of water and 1.32 parts by weight of ethylene oxide are similarly treated as in Example 1 to give 8.3 parts by weight of 1-(2-hydroxyethyl)-4 - piperidinopiperidine di(hydrogen maleate), white crystals melting at 192° to 194° C. with decomposition.

*Analysis.*—Calculated for $C_{20}H_{32}N_2O_9$ (percent): C, 54.03; H, 7.26; N, 6.30. Found (percent): C, 53.96; H, 7.29; N, 6.35.

EXAMPLE 3

Treatment of 6.3 parts by weight of 4-pyrrolidino-2,2,6,6-tetramethylpiperidine, 60 parts by volume of ethanol, 0.6 part by weight of water and 1.32 parts by weight of ethylene oxide as in Example 1 gives 9.0 parts by weight of 1 - (2-hydroxyethyl)-2,2,6,6-tetramethyl-4-pyrrolidinopiperidine di(hydrogen maleate), white crystals melting at 195° to 196° C.

*Analysis.*—Calculated for $C_{23}H_{38}N_2O_9 \cdot \frac{1}{2}H_2O$ (percent): C, 55.74; H, 7.93; N, 5.65. Found (percent): C, 55.58; H, 7.96; N, 6.07.

EXAMPLE 4

5.4 parts by weight of 4-(4-methyl - 1 - piperazinyl)-piperidine, 50 parts by volume of methanol, 0.6 part by weight of water and 1.32 parts of ethylene oxide treated as in Example 1 give 8.3 parts by weight of 1-(2-hydroxyethyl)-4-(4-methyl-1 - piperazinyl)piperidine tri(hydrogen maleate), white crystals melting at 196° to 197° C.

*Analysis.*—Calculated for $C_{24}H_{37}N_3O_{13}$ (percent): C, 50.08; H, 6.48; N, 7.30. Found (percent): C, 49.98; H, 6.44; N, 7.30.

EXAMPLE 5

5.4 parts by weight of 4-(4-methyl-1-piperazinyl) piperidine, 50 parts by volume of methanol and 2.64 parts by weight of ethylene oxide treated as in Example 1 (without using water) give 8.4 parts by weight of 1-(2-(2-hydroxyethoxy)ethyl)-4-(4-methyl-1-piperazinyl) - piperidine tri(hydrogen maleate), white crystals melting at 133° to 135° C.

*Analysis.*—Calculated for $C_{26}H_{41}N_3O_{14}$ (percent): C, 50.40; H, 6.67; N, 6.78. Found (percent): C, 50.03; H, 6.60; N, 6.47.

EXAMPLE 6

4.5 parts by weight of 4-pyrrolidinopiperidine is dissolved in 50 parts by volume of methanol, and 0.6 part by weight of water and 1.74 parts by weight of propylene oxide are added. The mixture is allowed to stand first at 35° to 40° C. for 4 hours and then at 50° to 60° C. for 2 hours. The solvent is removed under reduced pressure. The residue is treated with 14 parts by weight of maleic acid in 100 parts by volume of ethyl acetate. The resulting precipitate is collected and crystallized from methanol to give 7.5 parts by weight of 1-(2-hydroxypropyl)-4 - pyrrolidinopiperidine di(hydrogen maleate), white crystals melting at 190° to 191° C.

*Analysis.*—Calculated for $C_{20}H_{32}N_2O_9$ (percent): C, 51.94; H, 7.41; N, 6.06. Found (percent): C, 51.51; H, 7.54; N, 6.21.

EXAMPLE 7

5.03 parts by weight of 4-piperidinopiperidine, 50 parts by volume of methanol, 0.6 part by weight of water and 1.74 parts by weight of propylene oxide treated similarly as in Example 6 give 7.1 parts by weight of 1-(2-hydroxypropyl) - 4 - piperidinopiperidine di(hydrogen maleate), white crystals melting at 197° to 199° C.

*Analysis.*—Calculated for $C_{21}H_{34}N_2O_9$ (percent): C, 55.01; H, 7.47; N, 6.11. Found (percent): C, 54.88; H, 7.55; N, 5.84.

EXAMPLE 8

5.1 parts by weight of 4-morpholinopiperidine, 50 parts by volume of methanol, 0.6 part by weight of water and 3.08 parts by weight of epichlorohydrin treated similarly as in Example 6 give 6.7 parts by weight of 1-(3-chloro-2-hydroxypropyl) - 4-morpholinopiperidine di(hydrogen maleate), white crystals melting at 165° to 166° C.

*Analysis.*—Calculated for $C_{20}H_{31}N_2O_{10}Cl$ (percent): C, 48.54; H, 6.31; N, 5.66. Found (percent): C, 48.91; H, 6.54; N, 4.96.

EXAMPLE 9

5.1 parts by weight of 4-morpholinopiperidine is dissolved in 70 parts by volume of dimethylformamide, and 0.6 part by weight of water and 2.2 parts by weight of glycidol are added. The mixture is heated under reflux for 7 hours. Then the solvent is distilled off. The residue is treated with 14 parts by weight of maleic acid in 100 parts by volume of ethyl acetate. The precipitate is collected and crystallized from 90% ethanol to give 6.9 parts by weight of 1 - (2,3-dihydroxypropyl) - 4 - morpholino-piperidine di(hydrogen maleate), white crystals melting at 155° to 156° C.

*Analysis.*—Calculated for $C_{20}H_{32}N_2O_{11}$ (percent): C, 49.48; H, 6.85; N, 5.77. Found (percent): C, 49.53; H, 6.82; N, 5.42.

EXAMPLE 10

4.5 parts by weight of 4-pyrrolidinopiperidine, 70 parts by volume of dimethylformamide, 0.6 part by weight of water and 3.6 parts by weight of styrene oxide treated as in Example 9 give 8.9 parts by weight of 1-(2-phenyl-2-hydroxyethyl)-4-pyrrolidinopiperidine di(hydrogen maleate), white crystals melting at 184° to 185° C.

*Analysis.*—Calculated for $C_{25}H_{34}N_2O_9$ (percent): C, 57.24; H, 6.91; N, 5.34. Found (percent): C, 57.44; H, 7.00; N, 5.39.

EXAMPLE 11

1.6 parts by weight of 4-pyrrolidinopiperidine is dissolved in 30 parts by volume of ethanol, and 2 parts by volume of triethylamine and 0.96 part by weight of ethylene chlorohydrin are added. The mixture is heated under reflux with stirring. Then the solvent is distilled off. A small amount of water is added to the residue. The aqueous mixture is made alkaline with sodium carbonate and extracted with ethyl acetate. The extract is dried over potassium carbonate, and then the solvent is distilled off under reduced pressure. The residue is 1 - (2 - hydroxyethyl)-4-pyrrolidinopiperidine, and this is converted to its di(hydrogen maleate) by treatment with maleic acid. The salt, after crystallization from methanol, melts at 184° to 187° C. The yield is 2.3 parts by weight.

EXAMPLE 12

A mixture of 4.1 parts by weight of 4-pyrrolidino-piperidine, 2.5 parts by weight of 3-chloropropanol, 8.2 parts by weight of potassium carbonate and 270 parts by volume of dimethylformamide is heated to 60–70° C. for 8 hours. The solvent is distilled off. The oily residue (5.1 parts by weight) is treated with 5.7 parts by weight of maleic acid in acetone. The precipitate is collected and crystallized twice from ethanol to give 8.6 parts by weight of 1-(3-hydroxypropyl)-4-pyrrolidinopiperidine di(hydrogen maleate), which melts at 172° to 173° C.

*Analysis.*—Calculated for $C_{20}H_{32}N_2O_9 \cdot \frac{1}{2}H_2O$ (percent): C, 52.97; H, 7.33; N, 6.18. Found (percent): C, 52.89; H, 7.23; N, 6.17.

What is claimed is:
1. A compound of the formula:

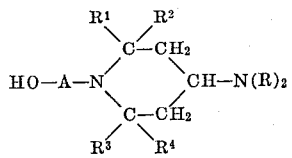

wherein A is a member selected from the group consisting of ethylene, oxydiethylene, propylene, trimethylene, (hydroxymethyl)ethylene, (chloromethyl)ethylene and phenylethylene, —N(R)₂ is a member selected from the group consisting of pyrrolidino, piperidino, morpholino and 4-methyl-1-piperazinyl, and each of $R^1$, $R^2$, $R^3$ and $R^4$ is a member selected from the group consisting of H and methyl.

2. A pharmaceutically acceptable acid addition salt of a compound according to claim 1.

3. A compound according to claim 1, said compound being 1-(2-hydroxyethyl)-4-pyrrolidinopiperidine.

4. A compound according to claim 1, said compound being 1-(2-hydroxyethyl)-4-piperidinopiperidine.

5. A compound according to claim 1, said compound being 1-(2-hydroxyethyl)-2,2,6,6-tetramethyl-4-pyrrolidinopiperidine.

6. A compound according to claim 1, said compound being 1-(2-hydroxyethyl)-4-(4-methyl-1-piperazinyl)piperidine.

7. A compound according to claim 1, said compound being 1-(2-(2-hydroxyethoxy)ethyl)-4-(4-methyl-1-piperazinyl)piperidine.

8. A compound according to claim 1, said compound being 1-(2-hydroxypropyl)-4-pyrrolidinopiperidine.

9. A compound according to claim 1, said compound being 1-(2-hydroxypropyl)-4-piperidinopiperidine.

10. A compound according to claim 1, said compound being 1-(3-chloro-2-hydroxypropyl)-4-morpholinopiperidine.

11. A compound according to claim 1, said compound being 1-(2,3-dihydroxypropyl)-4-morpholinopiperidine.

12. A compound according to claim 1, said compound being 1-(2-hydroxy-2-phenyl)-4-pyrrolidinopiperidine.

13. A compound according to claim 1, said compound being 1-(3-hydroxypropyl)-4-pyrrolidinopiperidine.

References Cited

UNITED STATES PATENTS 3,060,143   10/1962   Lee et al. _____ 260—294.7

ALEX MAZEL, Primary Examiner

A. M. T. TIGHE, Assistant Examiner

U.S. Cl. X.R.

260—268, 293, 294.7; 424—248, 250, 267